2,772,853
Patented Dec. 4, 1956

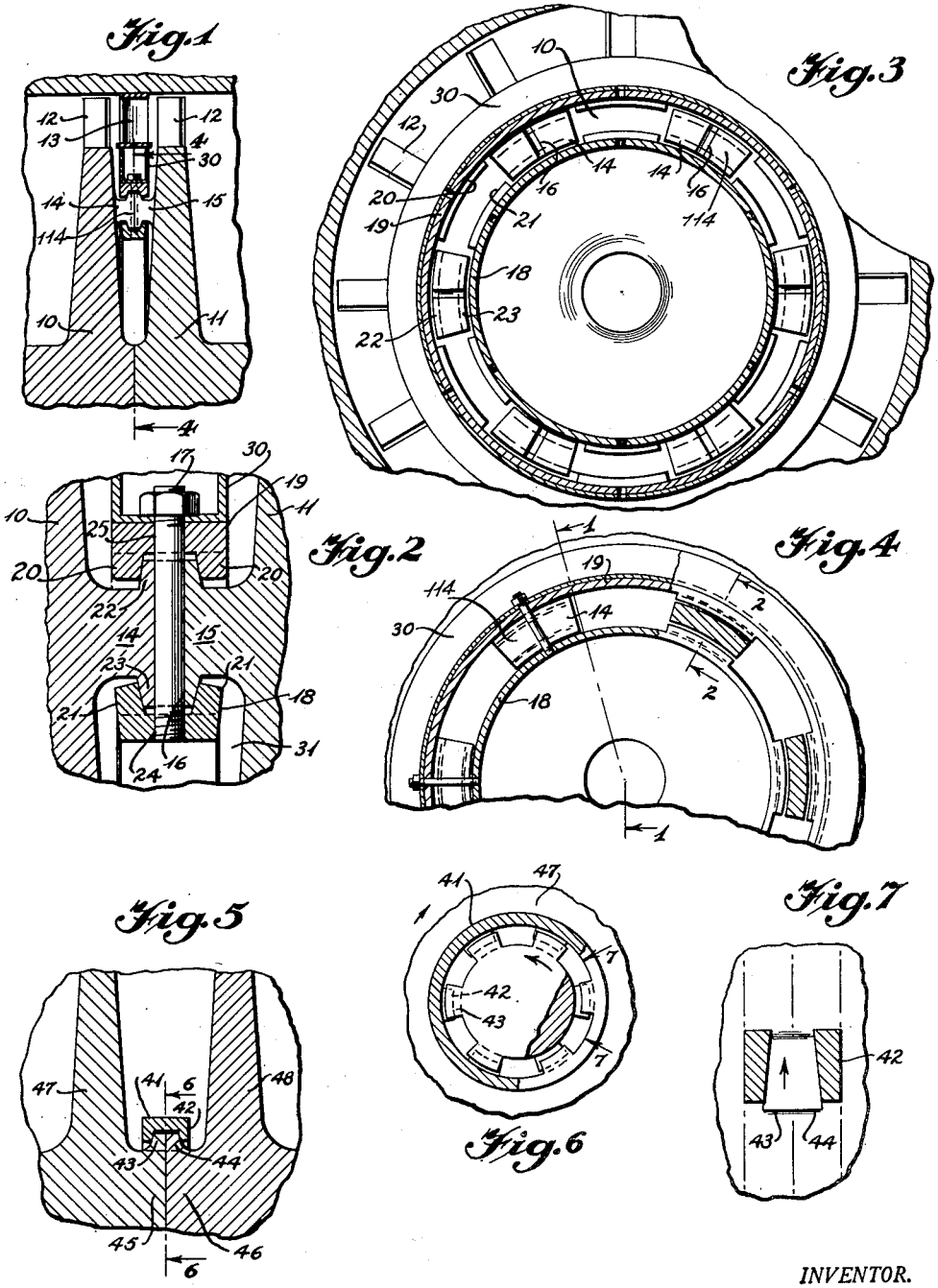

2,772,853

COMPRESSOR DISCS

Lee R. Woodworth, Los Angeles, Calif., assignor, by mesne assignments, to the United States of America as represented by the Secretary of the Navy Application April 7, 1952, Serial No. 280,866

3 Claims. (Cl. 253—39)

The present invention relates generally to locking means to secure turbine or compressor discs together and specifically describes a complete and unsplit ring by which such discs are joined.

In the manufacture and assembly of turbine or compressor discs and blading difficulty has been found in joining adjacent discs for movement together without radically weakening the cast structures of the discs or adding split locking elements subject to sheer and stress rupture in their assembly with the discs.

The present invention provides a disc locking means which does not require radical machining of any portion of the discs and has for its primary object to provide a simple locking means of relatively great strength and one not unduly subject to undistributed torque loads as in presently used split ring assemblies.

A further object of the invention is to provide locking means for turbine or compressor discs which permits the use of lugs or bosses cast integrally with the discs and require little or no machining.

Another object of the invention is to provide a means for quick assembly of a pair of discs with a minimum of parts.

A still further object is to provide complete rings to join the discs and which bear their own tangential or hoop stress without adding such stress to the discs.

Other objects and advantages of the invention will hereinafter become more fully apparent from the following description of the annexed drawings, which illustrate preferred embodiments and wherein:

Fig. 1 is a side view in section of two turbine or compressor discs with the locking means of this invention taken on line 1—1 of Fig. 4;

Fig. 2 is a detailed view greatly enlarged of the locking means in Fig. 1, taken on line 2—2 of Fig. 4;

Fig. 3 is a partial plan view of one disc with the locking rings in pre-assembled positions;

Fig. 4 is a partial plan view in section of the assembled discs and rings taken on line 4—4 of Fig. 1;

Fig. 5 is a partial end view in section of another embodiment of the invention;

Fig. 6 is a partial plan view taken on line 6—6 of Fig. 5, and

Fig. 7 is a greatly enlarged view in section of the locking ring of the second embodiment taken on line 7—7 of Fig. 6.

Referring to the drawing in which like numerals indicate like parts throughout the several views, in Figs. 1 and 2, turbine discs 10 and 11 have their blade peripheries 12 separated by the stationary blade ring 13. Circumferentially spaced bosses 14 and 15 on discs 10 and 11 respectively meet at mating surface 114 with the semicircular groove 16 of the mating bosses forming a bolthole for receiving bolt 17. The bolt-hole is segmented as seen in Fig. 3.

An inner ring 18 and an outer ring 19 each have circumferentially and axially spaced lug portions 20 and 21 which engage with the first and second oppositely protruding or radially overhanging uniting portions 22 and 23 of the bosses 14 and 15. Inner ring 18 is tapped as at 24 to receive the threaded end of bolt 17, the outer ring 19 having bolt holes 25. A seal ring 30 of U-shape is also provided with holes through which bolts 17 are positioned; the seal ring having clearance with the stationary blades 13 in the conventional manner.

In assembly, as shown in Fig. 3, the inner and outer rings 18 and 19 are slipped over one of the discs, 10 in this plan view, with their lug portions 20 and 21 in alignment, but between the circumferentially spaced, first and second oppositely protruding or radially overhanging uniting portions 22 and 23 of the bosses 14. Seal ring 30 is then slipped over the outer ring 19 and disc 11 is positioned with its oppositely protruding or radially overhanging portions 22 and 23 of bosses 15 similarly between the lug portions 20 and 21.

Assembly is completed by rotating the inner and outer rings 18, 19, and the seal ring 30 so that bolts 17 may be positioned and secured through all of the rings and through the holes formed by grooves 16 in bosses 14 and 15. The clearance space 31 between the rings and one of the discs is sufficient for insertion of a tool for aligning the inner ring, the particular tool not being here illustrated as it is not a part of this invention.

In the embodiment of the invention shown in Figs. 5, 6, and 7, a single outer ring 41 has lug portions 42 on each side, tapered as shown in Fig. 7 to engage with a wedging action with tapered protruding or radially overhanging portions 43 and 44 of the similarly segmented bosses 45 and 46 of discs 47 and 48, respectively. Fig. 6 shows the assembled condition after the bosses 45 and 46 have been aligned, with ring 41 previously assembled between the bosses 45 of disc 47, and then driven circumferentially in the direction indicated by the arrow in Fig. 6 into wedging engagement.

As will be readily seen, each of the embodiments of the invention are useful to secure the discs together, which obviously may be more than the two shown here, and each provides a simple device for easy assembly without requiring costly machining or undue weakening of the structure of the discs. The rings 18, 19, 41, distribute their stress and torque loads over all of the bosses equally and do not add to the torque load of the discs to any appreciable degree.

Various modifications are contemplated and may obviously be resorted to by those skilled in the art without departing from the spirit and scope of the invention, as hereinafter defined by the appended claims, as only preferred embodiments thereof have been disclosed.

What is claimed is:

1. Coupling apparatus for securing first and second turbine discs in a predetermined adjacent relationship comprising a plurality of bosses mounted in circumferentially spaced relationship on each of said turbine discs, inner and outer radially overhanging uniting portions on each of said bosses, mating surfaces on each of said bosses of said first turbine disc, corresponding mating surfaces on said bosses of said second turbine disc adapted to be effectively placed in contact with said mating surfaces of said bosses of said first turbine disc, a plurality of uniting means for coupling said bosses in fixed relationship when said mating surfaces are in contact, one of said uniting means adapted to coact with said inner overhanging portions of said bosses, another of said uniting means adapted to coact with said outer overhanging portions of said bosses, each of said uniting means comprising a member having axially spaced lugs mounted in circumferentially spaced relationship thereon which are adapted to coact with the overhanging uniting portions of said circumferentially spaced bosses when the overhanging portions are in mating contact, said lugs being positioned with respect to each other on each of said uniting means so that when each of said uniting means is circumferentially moved relative to said bosses said lugs come into engagement with said overhanging uniting portions of said bosses, and means for rigidly fastening said uniting means to said bosses when said bosses and said uniting means are in assembled relationship.

2. Coupling apparatus securing first and second members in a predetermined adjacent relationship comprising a plurality of bosses mounted in spaced relationship on each of said members, first and second oppositely protruding uniting portions having tapered side walls on each of said bosses, mating surfaces on each of said bosses and uniting portions of said first member, corresponding mating surfaces on each of said bosses and uniting portions of said second member in contact with said mating surfaces of said bosses and uniting portions of said first member, a plurality of uniting means coupling said bosses in fixed relationship when said mating surfaces are in contact, one of said uniting means being complementary to and coacting with the tapered side walls of said first oppositely protruding uniting portions of said bosses, another of said uniting means being complementary to and coacting with the tapered side walls of said second oppositely protruding uniting portions of said bosses, lugs positioned in spaced relationship on each of said uniting means whereby said bosses and said lugs can be positioned in an alternating staggered relationship so that when each of said uniting means is moved relative to said bosses, said lugs come into engagement with said tapered side walls of the oppositely protruding uniting portions of said bosses to hold said bosses of said first member in engagement with said bosses of said second member, and fastening means rigidly clamping and holding said uniting means relative to said bosses when said bosses and said uniting means are in assembled relationship.

3. Coupling apparatus as set forth in claim 2, wherein each of said mating surfaces of said bosses has corresponding portions thereof cut away, and said fastening means comprises a bolt extending through said cut away portions and secured to each of said uniting means.

References Cited in the file of this patent

UNITED STATES PATENTS

| | | |
|---|---|---|
| 1,080,825 | Fryer | Dec. 9, 1913 |
| 2,614,796 | Miller | Oct. 21, 1952 |

FOREIGN PATENTS

| | | |
|---|---|---|
| 375,363 | Germany | May 12, 1923 |
| 622,626 | Great Britain | May 4, 1949 |
| 942,230 | France | Sept. 13, 1948 |
| 960,069 | France | Oct. 17, 1949 |